United States Patent

[11] 3,629,076

[72] Inventor Edwin K. Jones
  Kenilworth, Ill.
[21] Appl. No. 70,258
[22] Filed Sept. 8, 1970
[45] Patented Dec. 21, 1971
[73] Assignee Universal Oil Products Company
  Des Plaines, Ill.

[54] DISTILLATION OF STYRENE CONTAINING A POLYMERIZATION INHIBITOR AND CONTACTING THE BOTTOMS STREAM WITH AN ALCOHOL
  10 Claims, 1 Drawing Fig.
[52] U.S. Cl............................................... 203/9,
  203/38, 203/47, 203/63, 203/78, 260/669 A
[51] Int. Cl........................................... B01d 3/34
[50] Field of Search.............................. 203/9, 38,
  47, 48, 78, 84, 63, 64, 29; 260/669 A

[56] References Cited
UNITED STATES PATENTS

| 2,467,152 | 4/1949 | Ohsol et al................. | 203/63 |
| 3,408,264 | 10/1968 | Ward........................... | 260/669 R |
| 3,476,656 | 11/1969 | Van Tassell et al.......... | 203/69 |
| 3,515,647 | 6/1970 | Van Tassell et al.......... | 203/9 |

Primary Examiner—Wilbur L. Bascomb, Jr.
Attorneys—James R. Hoatson, Jr. and Bernard L. Kramer ABSTRACT: Recovering polymerization inhibitor, including sulfur, cut-back oil, when employed, and undistilled styrene from the bottoms product of a styrene distillation column by treating the bottoms product with alcohol to precipitate polystyrene and part of the sulfur. The remaining liquid, including the remaining portion of the sulfur, is recycled back in the system. This improved method reduces the sulfur disposal problem and also recovers valuable materials.

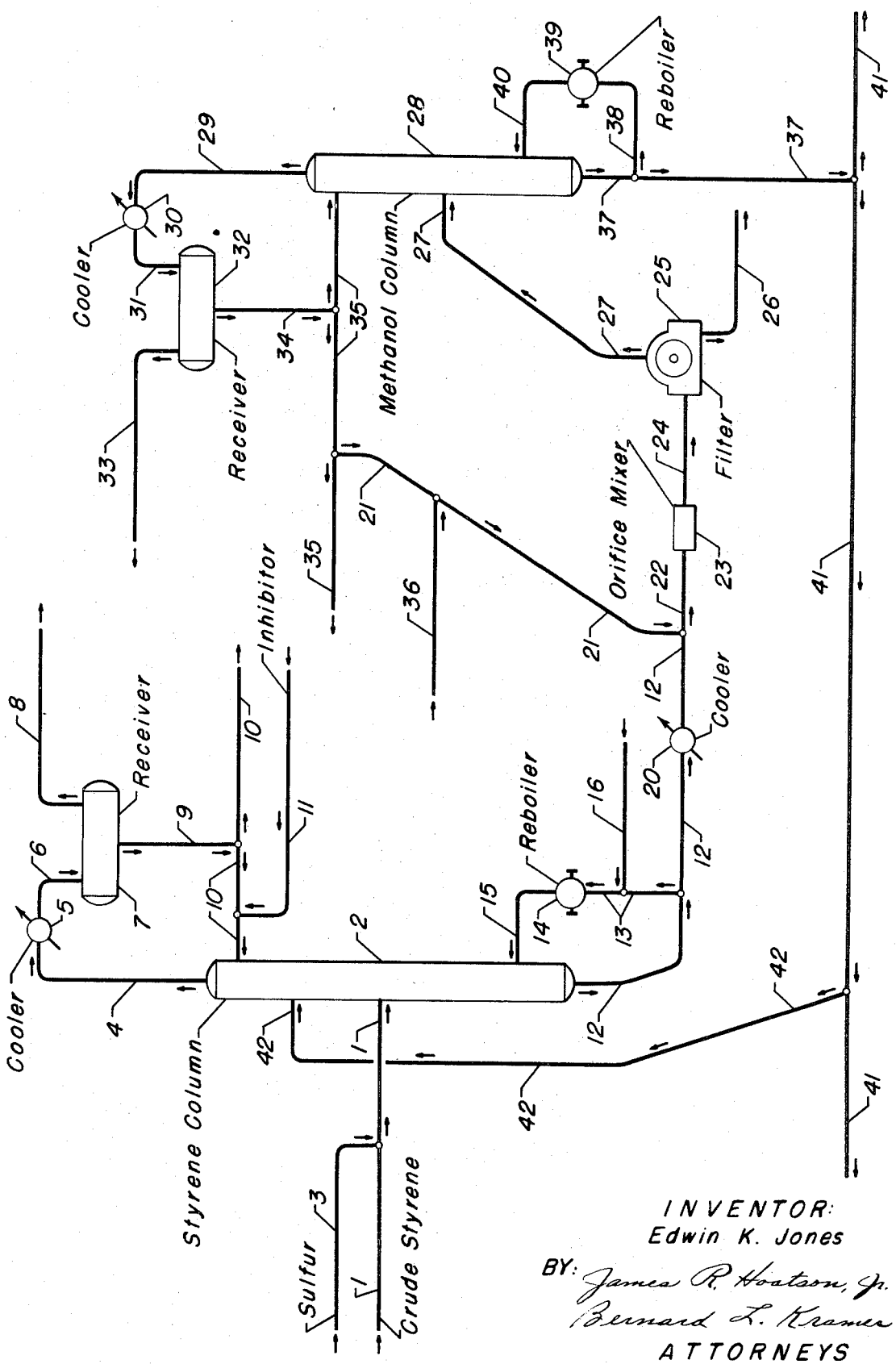

3,629,076

DISTILLATION OF STYRENE CONTAINING A POLYMERIZATION INHIBITOR AND CONTACTING THE BOTTOMS STREAM WITH AN ALCOHOL

BACKGROUND OF THE INVENTION

Present commercial operations comprise the dehydrogenation of ethylbenzene to styrene, followed by a distillation train to separate benzene-toluene as overhead from the first fractionation, ethylbenzene as overhead from the second fractionation and styrene as overhead from the final fractionation.

Because of the styrene monomer undergoes polymerization by the application of heat, the quality of the styrene degrades throughout the distillation recovery facilities. Accordingly, it is present practice to utilize polymerization inhibitors, such as sulfur, tertiarybutylcatechol, etc. In the final distillation step, to recover purified styrene as the overhead product, the bottoms product is composed of polystyrene, sulfur, tertiarybutylcatechol, undistilled styrene and cut-back oil, when used. The cut-back oil generally is employed to reduce the boiling temperature and the viscosity of the bottoms product and to thereby facilitate handling thereof. Because further processing of the bottoms product is an expensive and difficult procedure, the present practice generally is to burn the bottoms product or dispose of it by other means. However, such burning or other disposal of this product containing sulfur becomes a pollution problem.

DESCRIPTION OF THE INVENTION

In accordance with the present invention, the bottoms product is treated with alcohol to precipitate polystyrene and inherently part of the sulfur, and to thereby separate and recover undistilled styrene, tertiarybutylcatechol, cut-back oil, when employed, and part of the sulfur. These valuable and expensive materials are recycled, either directly to the styrene column or back to the benzene-toluene column and/or ethylbenzene column, to eventually be returned to the styrene column. In the precipitation of the styrene column bottoms, the polystyrene and a part of the sulfur are precipitated. This substantially reduces the sulfur disposal problem and, as herein before set forth, also recovers part of the sulfur for reuse in the distillation system.

In one embodiment, the present invention relates to an improvement in the distillation of crude styrene containing polymeric material and sulfur as polymerization inhibitor, to separate a purified overhead styrene product from a bottoms product containing polymeric material and sulfur, which comprises separately withdrawing said bottoms product, contacting alcohol therewith and thereby precipitating at least a part of said polymeric material and sulfur, and separately recovering the precipitated solid and the remaining liquid.

As hereinbefore set forth, the remaining liquid with comprise undistilled styrene, tertiarybutylcatechol, cut-back oil, when employed, and part of the sulfur. In one embodiment, the remaining liquid is recycled directly to the styrene column and, in another embodiment, the remaining liquid is recycled to an earlier step in the distillation train.

The invention will be further described in connection with the accompanying flow diagrammatic drawing which illustrates a specific embodiment of the invention. In the interest of simplicity, valves, pumps and similar appurtenances are omitted.

Referring to the drawing, crude styrene feed is introduced through line 1 into styrene column 2. As hereinbefore set forth, the crude styrene feed conventionally is the bottoms product from a preceding ethylbenzene column which, in turn, receives the bottoms product from a benzene-toluene column to which the effluent products from an ethylbenzene dehydrogenation system are supplied. As hereinbefore set forth, styrene undergoes polymerization upon heating to the temperatures required in the various fractionation steps, and, accordingly, a polymerization inhibitor is introduced at an early stage in the distillation train. Thus, the crude styrene feed generally contains sulfur as a polymerization inhibitor. However, when required, additional sulfur may be introduced by way of line 3 into line 1 to enter styrene column 2.

Styrene column 2 is of conventional design and will contain suitable vapor-liquid contacting devices, such as bubble cap trays, perforated trays, valve trays, etc. Column 2 preferably is maintained under vacuum in order to accomplish the desired distillation at the lowest practical temperature, thereby minimizing additional polymerization of the styrene. The operating conditions in column 2 may be a temperature of from about 100° F. to about 250° F. and a subatmospheric pressure from about 10 to about 200 mm. Hg absolute. The specific operating conditions will be selected to produce an overhead product of high purity styrene, which generally will be above 97 percent and even above 99 percent by weight styrene, depending upon the ultimate use of the styrene. The higher purity styrene is required for use in the manufacture of polystyrene, while a slightly less pure styrene is acceptable for use in the manufacture of synthetic styrene-butadiene rubber.

The purified styrene is withdrawn as an overhead stream through line 4, cooled and condensed in cooler 5, and directed by way of line 6 into receiver 7, having conventional vent line 8 directed to a vacuum system. The condensate in receiver 7 is withdrawn through lines 9 and 10 and recovered as the product of the process. At least a portion of the purified styrene is recycled by way of line 10 to the upper portion of crude column 2 to serve as a cooling and refluxing medium therein. As hereinbefore set forth, a polymerization inhibitor, generally tertiarybutylcatechol, is introduced through line 11 and supplied by way of line 10 into styrene column 2. An alternate injection point is sometimes into line 6. It is understood that other suitable polymerization inhibitors may be used.

As hereinbefore set forth, the bottoms fraction will comprise undistilled styrene, sulfur, tertiarybutylcatechol and/or other inhibitor, polystyrene and other high boiling material, and cut-back oil, when employed. The bottoms product is withdrawn from the lower portion of column 2 through line 12 and a portion thereof is directed through line 13, reboiler 14 and line 15 back to column 2. Cut-back oil, when employed, may be introduced through line 16 and passed by way of line 13, reboiler 14 and line 15 into column 2. Any suitable cut-back oil may be used and generally comprises a nonvolatile hydrocarbon mixture and conveniently polyethylbenzene. Other high boiling heavy aromatic hydrocarbon fractions such as isopropylbenzene, butylbenzene, etc., may be used, the only requirements being that the cut-back oil is stable and sufficiently higher boiling than styrene for ready separation by fractionation and also that it serves the purpose of maintaining a relatively low reboiler temperature and lowering viscosity of the bottoms product to pumpable limits.

In another embodiment of the invention, the crude column is operated at as low a temperature as practical to distill part of the styrene overhead and to leave a bottoms product comprising 20 percent to 60 percent styrene. The exact temperature employed in the bottom of the column will depend upon the amount of nonstyrene monomer components present in the styrene column. In this embodiment, cut-back oil is not required because the styrene in the bottoms serves the same purpose. This method also offers the advantage of effecting the distillation at a lower temperature, thereby further reducing undesired polymerization of the styrene.

In accordance with the present invention, the bottoms product withdrawn through line 12 from column 2 is cooled in cooler 20 and commingled with alcohol being supplied by way of line 21. The alcohol serves to precipitate the polystyrene and to thereby permit recovery of the remaining liquid comprising the expensive ingredients for further use in the process. Any suitable alcohol is used, with methanol being preferred. Other alcohols comprise ethanol, propanol, butanol, etc. The alcohol will be used in an amount sufficient to effect the desired precipitation and may range from about 20 to about 200 and preferably from about 50 to about 150 volumes of alcohol per 100 volumes of column bottoms. In the case here illustrated, the mixture of alcohol and column bottoms is passed through line 22, orifice mixer 23 or other suitable mixing device and then through line 24 to filter 25. Filter 25 may comprise a conventional continuous rotary filter which, when desired, may include precoating of the filter cloth with clay or other suitable coating material. The filtering is conventional practice and need not be described in detail herein. It is understood that other suitable filtering means may be employed.

In place of the filtering system described in the drawing, the alcohol and bottoms product may be directed into suitable tanks, drums and other containers and allowed to settle into a bottoms solid or heavy liquid product and an upper light liquid product. In still another embodiment, the precipitation may be effected in two or more stages, with suitable mixing means being employed to facilitate separation of the heavy liquid or solid phase and the light liquid phase. The precipitation is effected at any suitable temperature, with ambient temperature being preferred, although a lower or higher temperature, which generally will not exceed about 125° F., may be employed.

Referring again to the drawing, precipitated solid is withdrawn through line 26 and may be disposed of in any suitable manner. As hereinbefore set forth, the precipitated solid comprises polystyrene and a portion of the sulfur. However, the amount of sulfur to be disposed of is lower than in prior art processes and thus reduces the disposal problem. Also, this solid product does not require burning, which would cause a pollution problem. In still another embodiment of the invention, the solid being withdrawn through line 26 may be treated with aqueous ammonium sulfide solution to recover sulfur. The aqueous ammonium sulfide solution may range from about 5 percent to about 50 percent concentration and will be used in sufficient volume to extract the sulfur from the solid product. The volume of ammonium sulfide solution may range from 0.2 to 20 quantities of solution per quantity of solid product, and the separation may be effected by one or more contacting steps. The sulfur may be recovered from the aqueous solution in any suitable manner as, for example, by heating to elevated temperature to precipitate the sulfur, followed by filtration, centrifuging, gravity separation, etc. The recovered sulfur may be reused in the fractionation train.

Referring again to the drawing, the liquid separated from the precipitate is passed by way of line 27 into methanol column 28. As hereinbefore set forth, this liquid fraction comprise cut-back oil, when employed, tertiarybutylcatechol or other polymerization inhibitor, styrene which did not distill over in column 2, and part of the sulfur, as well as the alcohol. Methanol column 28 is operated to separate the alcohol as the overhead fraction. Methanol column 28 generally will be comparatively small in size and will contain suitable contacting devices as required. In order to avoid the use of high temperature in column 28, this column preferably is operated under vacuum which, here again, will be as low as practical and may range from 10 to 200 mm. Hg absolute. In the case illustrated, methanol is used as the alcohol and the methanol vapors are passed through line 29, cooler 30 and line 31 into receiver 32, having conventional vent line 33, normally directed to a vacuum system. The condensed methanol is withdrawn through line 34 and, while all or a portion may be removed from the process through line 35, a portion may be recycled by way of line 35 to the upper portion of column 28 to serve as a cooling and refluxing medium therein. In a preferred embodiment, a portion of the alcohol is directed through line 21 to be utilized in the manner hereinbefore set forth. Line 36 is provided for introducing fresh alcohol or makeup alcohol when desired.

The bottoms product is withdrawn from column 28 through line 37, with a portion thereof being directed through line 38, reboiler 39 and returned by way of line 40 to column 28. As hereinbefore set forth, the alcohol column will be maintained at the lowest temperatures satisfactory to distill the methanol from the bottoms product and may range from slightly above ambient to about 250° F. The bottoms product from column 28 will comprise styrene, tertiarybutylcatechol, cut-back oil, when employed, and sulfur. While this produce may be withdrawn from the process through line 41, at least a portion thereof is recycled by way of line 41 either to one of the earlier fractionators in the train or all or part thereof may be directed through line 42 back to styrene column 2. When this mixture is returned to an earlier column in the distillation train, most, if not all, thereof will eventually be returned to the styrene column.

From the above description it will seem that the present invention provides an improved method from recovering valuable polymerization inhibitors, styrene and cut-back oil, when employed. This offers a considerable economic advantage in providing for the reuse of these valuable materials.

As another advantage, the process of the present invention may be operated on a continuous basis and thus permits continuous recycle of the polymerization inhibitors, in the embodiment in which the styrene column is operated at a lower temperature, reduction in polymer formation is obtained and this, in turn, means a considerable reduction in the cost of the styrene column, reboiler and overhead condensing system.

The following examples are introduced to illustrate the novelty and utility of the present invention but not with the intention of unduly limiting the same.

EXAMPLE I

In an illustrative operation, the liquid effluent products from an ethylbenzene dehydrogenation system are charged to a benzene-toluene fractionating column, referred to in the industry as "B–T" column. This feed will be of the following approximate composition.

TABLE I

| LBS./HR. | Component |
|---|---|
| 136 | Benzene & Toluene |
| 4,654 | Ethylbenzene |
| 2,510 | Styrene |
| 9 | Sulfur |
| 7,309 | Total |

The bottoms product from the B–T column serves as charge to the ethylbenzene column, referred to in the industry as "E–B" column. The feed to this column is of the following approximate composition.

TABLE II

| LBS./HR. | Component |
|---|---|
| 4,654 | Ethylbenzene |
| 2,510 | Styrene |
| 18 | Sulfur |
| 7,182 | Total |

The bottoms product from the E–B column is referred to as crude styrene and is the feed to the styrene column. This feed is of the following approximate composition.

TABLE III

| LBS./HR. | Component |
|---|---|
| 2,485 | Styrene |
| 18 | Sulfur |
| 25 | Polystyrene |
| 0.3 | Tertiarybutylocatechol |
| 2,528.3 | Total |

The styrene column is maintained under conditions to produce an overhead styrene product of 97 percent by weight purity or better. This includes a bottom temperature of about 210° F. and a top temperature of about 140° F. and a reduced pressure in the bottom of the column of about 160 mm. Hg absolute and about 40 mm. Hg absolute at the top of the column. The bottoms being withdrawn from the styrene column will be of the following approximate composition.

TABLE IV

| LBS./HR. | Component |
| --- | --- |
| 18 | Sulfur |
| 65 | Polystyrene |
| 0.3 | Tertiarybutylcatechol |
| 73.3 | Total |

The bottoms product is commingled with an equal quantity of methanol at room temperature. Essentially all of the polystyrene and about one-half of the sulfur will be precipitated out of solution by the methanol, leaving 9 lbs. of sulfur and 0.3 lbs. of tertiarybutylcatechol per hour to be recycled back to the fractionators. In one method this recycle is sent back to the B–T column. In another method, it is returned to the styrene column. In still another method the recycle is split between two or three of the distillation columns in the train.

The above illustration does not include the styrene monomer, cut-back oil or both. When cut-back oil is used, a portion of the recycle preferably is directed back to the styrene column.

EXAMPLE II

In example I the cooled styrene column bottoms product is commingled with the methanol and passed through an orifice and then into a continuous rotary filter. In another example, the cooled styrene column bottoms product is mixed with methanol and the mixture is directed into one or more drums, each of which is arranged to permit settling therein. The solids, or heavy liquid, is allowed to settle, after which the light liquid and solid products, or heavy liquid, are separately withdrawn, with the light liquid products being separated from the methanol and recycled as aforesaid.

I claim as my invention:

1. In the distillation of crude styrene containing polymeric material and sulfur as polymerization inhibitor to separate a purified overhead styrene product from a bottoms product containing polymeric material and sulfur, the improvement which comprises separately withdrawing said bottoms product, contacting alcohol therewith and thereby precipitating at least a part of polyermic material and sulfur, and separately recovering the precipitated materials and the remaining light liquid.

2. The method of claim 1 in which the remaining liquid is fractionated to recover the alcohol for reuse in the process and to separate alcohol-free remaining liquid.

3. The method of claim 2 in which the alcohol-free remaining liquid is recycled at least in part to the first mentioned distillation.

4. The method of claim 2 in which the alcohol-free remaining liquid is recycled at least in part to an earlier column in the distillation train.

5. The method of claim 1 in which tertiarybutylcatechol is supplied to the first mentioned distillation and is recovered in said remaining light liquid.

6. The method of claim 1 in which cut-back oil is supplied to the first mentioned distillation and is recovered in said remaining light liquid.

7. The method of claim 1 in which said alcohol is menthanol.

8. The method of claim 1 in which the precipitated solid is separated from the remaining light liquid by filtering.

9. The method of claim 1 in which the precipitated material is separated as a bottom layer by settling.

10. The method of claim 1 in which sulfur is extracted from said precipitated materials by treating with ammonium sulfide.

* * * * *